Nov. 10, 1925.                                                 1,561,175
                      O. A. LABUS
                COMPRESSOR VALVE ASSEMBLY
                   Filed July 3, 1924           2 Sheets-Sheet 1

WITNESSES
Louis Goodman
E. N. Lovewell

INVENTOR
                                       Otto A. Labus
                                  BY
                                                ATTORNEY Nov. 10, 1925.　　　　　　　　　　　　　　　　　　　1,561,175
O. A. LABUS
COMPRESSOR VALVE ASSEMBLY
Filed July 3, 1924　　　　2 Sheets-Sheet 2
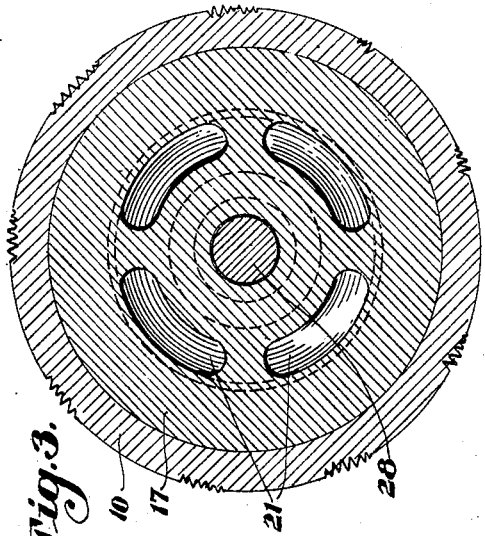
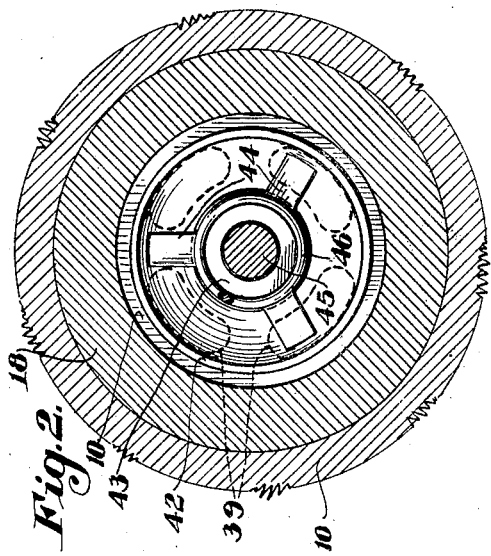
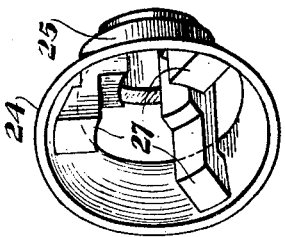
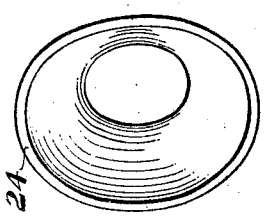
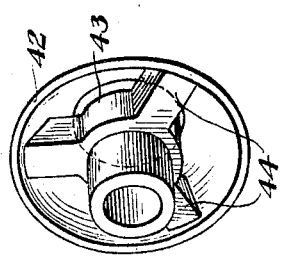
WITNESSES
Louis Goodman
E. N. Lovewell
INVENTOR
Otto A. Labus
BY
ATTORNEY Patented Nov. 10, 1925.

1,561,175

UNITED STATES PATENT OFFICE.

OTTO A. LABUS, OF WISCONSIN RAPIDS, WISCONSIN.

COMPRESSOR-VALVE ASSEMBLY.

Application filed July 3, 1924. Serial No. 724,070.

*To all whom it may concern:*

Be it known that I, OTTO A. LABUS, a citizen of the United States, residing at Wisconsin Rapids, in the county of Wood and State of Wisconsin, have invented a new and useful Compressor-Valve Assembly, of which the following is a specification.

This invention relates to a valve assembly adapted especially to be used in connection with an intake port and an exhaust port, such as form a part of an air or gas compressor, pump or similar apparatus.

In this class of apparatus, it was formerly customary to use ordinary poppet valves having tapered seats, but such valves are comparatively heavy, and do not respond quickly to the action of the piston. In order to overcome this objection, so that the pump or compressor piston could be operated at a high speed, it was later proposed to use a light-weight valve in the form of an annular ring or plate, coacting with a seat disposed in a plane perpendicular to the passageway or port. Such a valve offers too much resistance to the passage of the air or gas, and also frequently becomes tilted, so that it sticks or binds and fails to close properly.

The main object of the present invention is to provide an assembly embodying the desirable features of both of the above mentioned types of valve, but with none of their disadvantages, in short to provide a light quick acting valve having a conical seat, and means cooperating therewith to guide the valve accurately and hold it in a true position with relation to its seat. Owing to the tapered form of the valve any wear on the valve or valve seat is automatically taken up. It also frees itself from grit, scale or other foreign matter which is usually trapped on a flat valve seat.

The objects and advantages of my invention will be more fully set forth in the detailed description which follows, taken in conection with the accompanying drawings which illustrate the invention in its preferred form.

In the drawings:

Figure 2 is an enlarged sectional view taken on the line 2—2 of Figure 1.

Figure 3 is an enlarged sectional view taken on the line 3—3 of Figure 1.

Figure 4 is a detail perspective view of the discharge valve and the spider which cooperates therewith.

Figure 5 is a detail perspective view of the valve detached.

Figure 6 is a detail perspective view of the intake valve and the spider which cooperates therewith.

Figure 1:
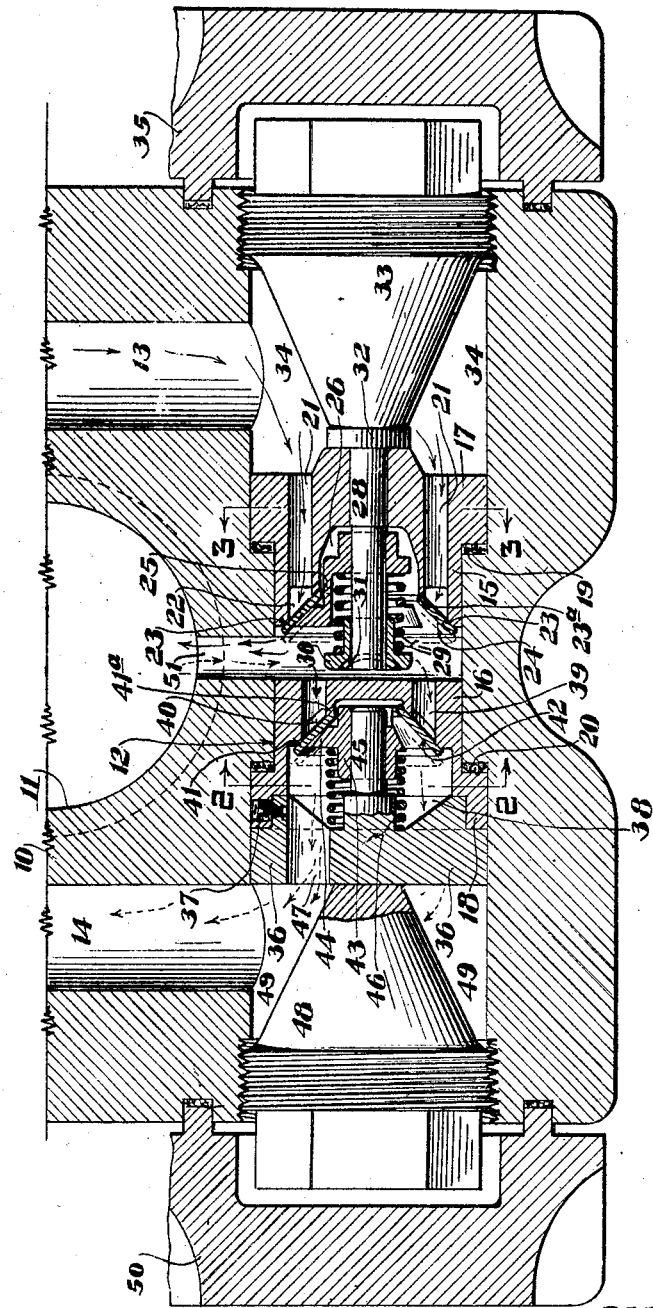
Figure 1 is a sectional view taken longitudinally through the valves.

For the purpose of illustrating the structure and operation of the invention, the same is shown in connection with a block or casting 10, having a cylinder bore 11, in which operates the piston. In proximity to the cylinder bore, and preferably arranged beneath the same and transversely beneath the block, is a bore 12 adapted to receive the valve cages for the inlet and discharge valves, and having an inlet port 13 and discharge port 14. The inlet valve cage 15 and the outlet valve cage 16 are inserted from opposite ends of the bore 12, and are provided at their outer ends with enlarged heads 17 and 18, which form annular shoulders adapted to seat against corresponding shoulders 19 and 20 formed by enlarging the end portions of the bore 12.

The valve cage 15, as shown in Figures 1 and 3, is provided with an annular series of ports 21, which extend longitudinally through the valve cage, and lead to an annular chamber 22. The inner end of the cage is formed inside and outside of the chamber 22 with tapered valve seats 23 and 23$^a$ which constitute parts of the same conical surface, and against which the inlet valve 24 is adapted to seat. This inlet valve is comparatively light, and is in the shape of a conical ring, normally held upon its seat by a spider 25 located partly within a recess 26 in the inner end of the valve cage, and having three or more divergent arms 27, which are shaped so as to fit against the inner face of the valve 24, but not integral therewith. The spider 25 is reciprocably mounted on a stem 28, which extends centrally through the valve cage, and a coiled spring 29, surrounding the inner end of the pin, and acting between the spider 25 and a head 30 secured by a locking pin 31 or the like to the inner end of the stem 28, normally holds the valve 23 against its seat. The outer end of the stem 28 is formed with a head 32, which is held firmly against the outer end of the cage by a plug 33 threaded into the outer end of the bore and having its inner end tapered, so as to leave a chamber 34 through which the air or gas passes into the several ports 21. The plug 33 is preferably covered by a cap 35, to insure the apparatus against leakage.

The head 18 of the discharge valve cage 16 has a removable section 36, which may be conveniently secured thereto by set screws 37 or the like, and defines a valve chamber 38 within which the discharge valve 20 is located. Discharge ports 39 lead through the inner end of the cage 16 to an annular space 40, on the inside and outside of which are tapered conical seats 41 and 41$^a$ on which the discharge valve 42 is normally seated. The discharge valve is similar to the intake valve, except that it may be somewhat smaller, and it is held against its seat by a spider 43 having arms 44 closely engaging the inner face of the valve. The outer section 36 of the discharge valve cage has a stem 45 extending inwardly, and on which the spider 43 is reciprocably mounted. A coiled spring 46 surrounds the stem 45, and urges the valve 42 against its seat. The section 36 of the valve cage has ports 47 extending therethrough, which correspond to the ports 39, but are preferably larger. The discharge valve cage is held firmly against the shoulder 20 by a plug 48, which is threaded into the end of the bore, and is tapered so as to leave an annular chamber 49 through which the air or gas is forced into the discharge port 14. The plug 48 is preferably covered by a cap 50, similar to the cap 35.

As shown in the drawings, the space between the valve cages 15 and 16 communicates with the interior of the cylinder 11 by a single port 51. During the suction stroke of the piston, the valve 24 is opened against the resistance of the spring 29, and the air or gas passes through the port 13, chamber 34 and ports 21 and 51 into the cylinder. At the beginning of the compression stroke, the valve 24, which is comparatively light, immediately flies back upon its seat by reason of the spring. The valve is guided in its movement upon the arms 27 of the spider, and the spider itself immediately follows under pressure of the spring 29. The contents of the cylinder 11 are then forced through the ports 39, past the valve 42 into the chamber 38, and through the ports 47 and 14.

It will be noted that the annular conical valves are disposed with their small ends against the direction of flow. This causes much less resistance to the flow of the air or gas than is the case with the ordinary ring plate valve, having a flat annular ring disposed in a plane at right angles to the direction of flow. The action of the conical valves is also smoother and more noiseless. It should be noted, however, that although the valve itself is light and acts quickly, the spider holds it in true position with relation to its seat, and prevents any possibility of the valve tilting so as to bind or stick.

While I have shown and described specifically one form in which the invention may be embodied, it is to be understood that this is merely illustrative and that various modifications may be made in the size, shape and relative arrangement of the various parts of the device, and also the principles of the invention may be used in other relations without departing from the salient features of the invention, or sacrificing any of its advantages. It is my intention, therefore, to include all such modifications within the scope of the appended claims.

What is claimed is:

1. In a device of the character described, the combination of a block having a bore with an inlet port at one end and a discharge port at the other end, a cylinder in constant communication with the central part of the bore, an inlet valve cage and an outlet valve cage in opposite ends of said bore, each having an annular series of ports terminating at their discharge ends in a common annular chamber, with the adjacent end of the cage inside and outside of the chamber forming a conical valve seat, a correspondingly shaped valve coacting with said seat, and means normally holding each valve in engagement with its seat and covering the annular chamber, the means holding the inlet valve being responsive to suction in the cylinder to permit said valve to open, and the means holding the outlet valve being similarly responsive to pressure in the cylinder.

2. In a device of the character described, the combination of a block having a bore with an inlet port at one end and a discharge port at the other end, a cylinder in constant communication with the central part of the bore, an inlet valve cage and an outlet valve cage in opposite ends of said bore, each having a series of ports therethrough, the discharge end of each cage being formed with a conical valve seat tapered in a direction opposite to the direction of flow, a conical ring valve coacting with said seat, a spider on which the valve is guided, said spider having arms with tapered surfaces normally engaging the inside face of the valve, a stem mounted centrally of the cage and slidably supporting said spider, a spring acting between the stem and spider to cause the latter to normally hold the corresponding valve on its seat, the springs associated with the respective valves being yieldable to permit the valves to open in response respectively to suction and pressure in the cylinder.

3. In a device of the character described, the combination of a block having a cylinder formed therein and having a bore extending transversely beneath the cylinder, the central part of the bore being in communication with said cylinder, an inlet valve cage and an outlet valve cage in opposite ends of said bore, each having an annular series of ports terminating at their discharge ends in a common annular chamber, with the adjacent end of the cage inside and outside of the chamber forming a conical valve seat tapered in a direction opposite to the direction of flow, a conical ring valve coacting with said seat and adapted to cover the annular chamber, a spider in each cage on which the valve is guided, said spider having arms with tapered surfaces normally engaging the inside face of the valve, a stem mounted centrally of the cage and slidably supporting said spider, a spring acting between the stem and spider to cause the latter to normally hold the valve on its seat, the springs associated with the respective valves being yieldable to permit the valves to open in response respectively to suction and pressure in the cylinder.

4. In a device of the character described, the combination of a block having a bore with an inlet port at one end and a discharge port at the other end, a cylinder in constant communication with the central part of the bore, an inlet valve cage and an outlet valve cage in opposite ends of said bore, each having a series of ports therethrough, each of said cages having its outer end enlarged, the corresponding end of the bore being enlarged to form an annular shoulder against which the enlraged portion of the cage is seated, a valve covering the outlet ends of the ports through the cage, a stem mounted centrally of each cage, spring held means supported on said stem to normally hold the valve on its seat, the outer end of the stem having a head seated against the end of the cage, and a tapered plug threaded into the adjacent end of the bore and engaging the head of said stem to hold the head of the stem and the cage upon their seats.

5. In a device of the character described, the combination of a block having a cylinder formed therein, a bore extending transversely of the block beneath the cylinder with its central portion in communication with said cylinder, said bore having an inlet port at one end and a discharge port at the other end, an inlet valve cage and an outlet valve cage at opposite ends of said bore, each having an annular series of ports terminating at their discharge ends in a common annular chamber with the adjacent end of the cage inside and outside of the chamber forming a conical valve seat, a conical valve coacting with said seat and normally covering the annular chamber, a stem mounted centrally of each cage, and spring held means supported on said stem to normally hold the corresponding valve on its seat, each of said cages having its outer end enlarged to form a head, the corresponding end of the bore being enlarged to form an anuular shoulder against which the head is seated.

6. In a device of the character described, the combination of a block having a bore, with an inlet port at one end and a discharge port at the other end, a cylinder in constant communication with the central part of the bore, an inlet valve cage and an outlet valve cage at opposite ends of said bore, each having ports therethrough, each of said cages having its outer end enlarged to form a head, the corresponding end of the bore being enlarged to form an annular shoulder against which the head of the corresponding cage is seated, a valve covering the outlet ends of the ports through the cage, a stem mounted centrally of each cage, a spider slidably supported on said stem and having arms with tapered surfaces normally engaging the inside face of the corresponding valve, and a spring acting between the stem and spider to cause the latter to normally hold the valve on its seat.

7. In a valve assembly, the combination of a block having a bore with a portion thereof enlarged to form an annular shoulder, a cage fitting within said bore and having an enlarged head normally seating against said shoulder, said cage having an annular series of ports extending longitudinally therethrough and terminating at their discharge ends in a common annular chamber, with the adjacent end of the cage inside and outside of the chamber forming a conical valve seat, a conical ring valve coacting with said seat, and yieldable means normally holding the valve in engagement with its seat and covering said annular chamber.

8. In a valve assembly, the combination of a block having a bore with a portion thereof enlarged to form an annular shoulder, a cage fitting within said bore and having an enlarged head normally seated against said shoulder, said cage having ports extending longitudinally therethrough, the discharge end of said cage being formed with a conical seat tapered in a direction opposite to the direction of flow, a conical ring valve coacting with said seat, a spider on which the valve is guided, said spider having arms with tapered surfaces normally engaging the inside face of the valve, a stem mounted centrally of the cage and slidably supporting said spider, and a spring acting between the stem and spider to cause the latter to normally hold the valve on its seat.

9. In a valve assembly, the combination of a valve cage having an annular seat at one end tapered in a direction opposite to the direction of flow and having a series of ports therethrough terminating in said seat, a conical ring valve coacting with said seat and adapted to close said ports, a stem mounted centrally of said valve cage, and seat, a spider slidably mounted on said stem and having arms with tapered surfaces normally engaging the inside face of said conical ring valve, and a spring acting between the stem and spider to cause the latter to normally hold the valve on its seat.

10. In a valve assembly, the combination of a valve cage having a series of annularly arranged ports extending longitudinally therethrough and terminating in a tapered valve seat, a conical ring valve coacting with said seat, said valve having a uniform taper and thickness throughout, a slidably supported valve guide means in contact with the inner conical surface of said valve ring normally holding said valve in concentric position with relation to the axis of said valve seat, a stem which is centrally located with relation to the valve seat and on which said guide means is slidable, and a spring acting between the stem and guide means to cause the latter to normally hold the valve on its seat.

11. In a valve assembly, the combination of a valve cage having a head at one end and a conical tapered valve seat at the other end and having a series of annularly arranged ports extending longitudinally through said head and seat, a stem mounted centrally of the valve cage, a stem, guide means sidably supported on said stem and having extended members with tapered surfaces, a conical ring valve, the inner surface of which is normally engaged by the tapered surfaces of said extended members, said valve being of uniform thickness and having parallel tapered surfaces extending from edge to edge thereof, and a spring acting between said stem and guide means to cause the latter to hold the valve against said valve seat.

In testimony that I claim the foregoing as my own, I have hereto affixed my signature.

OTTO A. LABUS.